(12) United States Patent
Otoshi

(10) Patent No.: US 8,318,072 B2
(45) Date of Patent: Nov. 27, 2012

(54) STRETCHED CELLULOSE ACYLATE FILM AND PROCESS FOR PRODUCING THE SAME

(75) Inventor: Masaaki Otoshi, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 332 days.

(21) Appl. No.: 12/600,183

(22) PCT Filed: May 9, 2008

(86) PCT No.: PCT/JP2008/058628
§ 371 (c)(1),
(2), (4) Date: Nov. 13, 2009

(87) PCT Pub. No.: WO2008/143030
PCT Pub. Date: Nov. 27, 2008

(65) Prior Publication Data
US 2010/0222567 A1    Sep. 2, 2010

(30) Foreign Application Priority Data
May 14, 2007    (JP) .................................. 2007-128061

(51) Int. Cl.
*B29C 55/06*    (2006.01)
(52) U.S. Cl. ......................... 264/288.4; 264/291; 425/66
(58) Field of Classification Search ............... 264/288.4, 264/291; 425/66
See application file for complete search history.

(56) References Cited

U.S. PATENT DOCUMENTS
5,219,510 A    6/1993    Machell et al.
5,288,715 A    2/1994    Machell et al.

FOREIGN PATENT DOCUMENTS
JP    5-185445 A    7/1993
(Continued)

OTHER PUBLICATIONS

Notice of Reasons for Rejection, dated Sep. 12, 2011, issued in corresponding JP Application No. 2007-128061, 6 pages in English and Japanese.
International Preliminary Report on Patentability and Written Opinion, mailed Nov. 26, 2009, issued in corresponding PCT Application No. PCT/JP2008/058628, 17 pages English and Japanese.
Decision of Rejection, dated Jul. 3, 2012, issued in corresponding JP Application No. 2007-128061, 4 pages in English and Japanese.

*Primary Examiner* — Joseph Del Sole
*Assistant Examiner* — James Sanders
(74) *Attorney, Agent, or Firm* — Sughrue Mion, PLLC

(57) ABSTRACT

One embodiment of the present invention provides a method for producing a stretched cellulose acylate film with an in-plane retardation, Re, of 100 nm or more and a relationship between the thickness direction retardation, Rth, and Re which satisfies Rth<(Re/2), by longitudinally stretching an unstretched cellulose acylate film in a longitudinal direction by pulling by means of a difference in circumferential velocity between a pair of rollers, wherein the method is characterized in that the cellulose acylate film is subjected to free-end uniaxial stretching to a longitudinal stretch ratio of 1 to 2 while the film is being heated in a heating oven installed between the pair of rollers at a stretching temperature in the range of Tc−10° C. to Tc+70° C., Tc being the crystallization temperature of the film, and with the temperature difference in the film width direction maintained within 10° C.

13 Claims, 4 Drawing Sheets

FOREIGN PATENT DOCUMENTS

| | | |
|---|---|---|
| JP | 6-501040 A | 2/1994 |
| JP | 8-278266 A | 10/1996 |
| JP | 09-193240 A | 7/1997 |
| JP | 2001-42130 A | 2/2001 |
| JP | 2005-316094 A | 11/2005 |
| JP | 2005-316094 A * | 11/2005 |
| JP | 2006-317734 A | 11/2006 |
| JP | 2007-086755 A * | 4/2007 |
| JP | 2008-68533 A | 3/2008 |
| WO | 2007/023986 A1 | 3/2007 |

* cited by examiner

FIG.4

| | | | Example 1 | Example 2 | Example 3 | Example 4 | Example 5 | Example 6 | Example 7 | Example 8 | Example 9 | Example 10 | Example 11 | Example 12 | Comparative Example 1 | Comparative Example 2 | Comparative Example 3 | Comparative Example 4 |
|---|---|---|---|---|---|---|---|---|---|---|---|---|---|---|---|---|---|---|
| Distance between rolls | | m | 10 | 100 | 10 | 10 | 10 | 10 | 10 | 10 | 10 | 10 | 3 | 110 | 10 | 10 | 10 | 0.8 |
| Stretching stress | | MPa | 2.2 | 2.4 | 0.6 | 6.3 | 0.5 | 7.5 | 2.9 | 2.5 | 2.3 | 3.2 | 2.2 | 2.1 | 6 | 9 | 0.3 | 3.5 |
| Longitudinal stretch ratio | | | 1.5 | 1.5 | 1.1 | 1.9 | 1.5 | 1.5 | 1.5 | 1.5 | 1.5 | 1.5 | 1.5 | 1.5 | 2.1 | 1.5 | 1.5 | 1.5 |
| Resin | | | TAC | TAC | TAC | TAC | TAC | TAC | TAC | TAC | TAC | TAC | TAC | TAC | TAC | TAC | TAC | TAC |
| | | Tc | 195 | 195 | 195 | 195 | 195 | 195 | 195 | 195 | 195 | 195 | 195 | 195 | 195 | 195 | 195 | 195 |
| Heating temperature | Heating temperature | Deg. | 240 | 240 | 240 | 240 | 260 | 190 | 240 | 240 | 240 | 240 | 240 | 240 | 240 | 180 | 280 | 240 |
| | Width direction difference | Deg. | 5 | 4.3 | 5.3 | 6.2 | 8.3 | 3.2 | 2.4 | 4.5 | 4.6 | 6.1 | 9.7 | 5.7 | 5 | 5 | 5 | 15 |
| | Temperature raising rate | Deg./Min. | 100 | 100 | 100 | 100 | 100 | 100 | 100 | 100 | 100 | 12 | 380 | 9 | 100 | 100 | 100 | 430 |
| | Temperature lowering rate | Deg./Min. | 120 | 120 | 120 | 120 | 120 | 120 | 120 | 120 | 120 | 12 | 390 | 8 | 120 | 120 | 120 | 390 |
| Stretching time in heating oven | | Sec. | 50 | 100 | 50 | 50 | 50 | 50 | 50 | 50 | 50 | 50 | 1 | 110 | 50 | 50 | 50 | 0.8 |
| Heating nozzle | Slit width | mm | 5 | 5 | 5 | 5 | 5 | 5 | 9 | 2 | 5 | 1 | 5 | 5 | 5 | 5 | 5 | 15 |
| | Distance to film | mm | 50 | 50 | 50 | 50 | 50 | 50 | 50 | 50 | 450 | 50 | 20 | 15 | 50 | 50 | 50 | 600 |
| | Wind velocity | m/Min. | 5 | 5 | 5 | 5 | 5 | 5 | 5 | 5 | 5 | 0.6 | 18 | 0.3 | 5 | 5 | 5 | 25 |
| Float-conveying; floating height | | mm | - | - | - | - | - | - | - | - | - | 20 | - | - | - | - | - | 35 |
| Evaluation | Re | nm | 200 | 195 | 135 | 240 | 120 | 250 | 210 | 206 | 198 | 192 | 194 | 206 | ---Broken--- | 130 | 90 | 198 |
| | Rth | nm | 2 | 1 | -5 | 30 | 50 | 100 | 5 | 10 | 6 | 4 | 11 | 15 | | 100 | 20 | 10 |
| | Surface appearance | | ◎ | ◎ | ◎ | ◎ | ◎ | ◎ | ○ | ○ | △ | △ | ○ | △ | ---Broken--- | ◎ | ◎ | × |
| | Displacement of orientation axis | | ◎ | ◎ | ◎ | ◎ | ◎ | ◎ | ○ | ○ | ○ | △ | △ | △ | | ◎ | ◎ | × |

STRETCHED CELLULOSE ACYLATE FILM AND PROCESS FOR PRODUCING THE SAME

TECHNICAL FIELD

The present invention relates to a stretched cellulose acylate film and a process for producing the same, especially to a technique for producing a stretched cellulose acylate film by uniaxial stretching involving only longitudinal stretching, the film being used as a phase difference film (also referred to as an optical compensation film) for a liquid crystal display.

BACKGROUND ART

The cellulose acylate film is widely used as a phase difference film for a liquid crystal display due to its transparency, toughness, and optical isotropy.

Production of the cellulose acylate film is broadly divided into a solution film-forming method and a melt film-forming method. The solution film-forming method is a method where a dope obtained by dissolving a thermoplastic resin in a solvent is cast into a film from a die on a support, for example, a cooling drum. The melt film-forming method is a method where a thermoplastic resin is melted in an extruder and, thereafter, is extruded into a film from a die on a support, for example, a cooling drum. An unstretched cellulose acylate film formed by these methods is usually stretched in the machine (longitudinal) direction or transverse (width) direction (to obtain a stretched cellulose acylate film) for the film to develop an in-plane retardation (Re) and a thickness direction retardation (Rth). This film is used as a phase difference film for a liquid crystal display to widen the viewing angle (see, for example, Patent Document 1 and Patent Document 2).

Patent Document 1: National Publication of International Patent Application No. H6-501040
Patent Document 2: Japanese Patent Application Laid-Open No. 2001-42130

DISCLOSURE OF THE INVENTION

Problems to be Solved by the Invention

Meanwhile, liquid crystal modes for a liquid crystal display include vertical alignment (VA) mode, optically compensated bend (OCB) mode, in-plane switching (IPS) mode, and a phase difference film having retardations, Re and Rth, suitable for each liquid crystal mode is required. Particularly, a phase difference film having a high Re and a low Rth is required.

Specifically, there is desired a stretched cellulose acylate film having an in-plane retardation, Re, of 100 nm or more and a relationship between a thickness direction retardation, Rth, and Re, which satisfies Rth<(Re/2).

The present invention has been made in view of these circumstances, and an object thereof is to provide a stretched cellulose acylate film having an in-plane retardation, Re, of 100 nm or more and a relationship between a thickness direction retardation, Rth, and Re which satisfies Rth<(Re/2), a method for producing the same, and a phase difference film.

Means for Solving the Problems

A first aspect of the present invention provides, in order to accomplish the aforementioned object, a method for producing a stretched cellulose acylate film having an in-plane retardation, Re, of 100 nm or more and a relationship between the thickness direction retardation, Rth, and Re, which satisfies Rth<(Re/2), by longitudinally stretching an unstretched cellulose acylate film in the longitudinal direction by pulling by means of a difference in circumferential velocity between a pair of rollers, wherein the cellulose acylate film is subjected to free-end uniaxial stretching to a longitudinal stretch ratio of 1 to 2 while the film is being heated in a heating oven installed between the pair of rollers at a stretching temperature in the range of Tc−10° C. to Tc+70° C., Tc being the crystallization temperature of the film, and with the temperature difference in the film width direction maintained within 10° C.

According to the first aspect, the cellulose acylate film is subjected to free-end uniaxial stretching in the longitudinal direction of the film to a longitudinal stretch ratio of 1 to 2 while the film is being heated uniformly in a heating oven installed between a pair of stretching rollers under the stretch temperature condition of a high temperature (Tc−10° C.<Tc<Tc+70° C.), which is close to the crystallization temperature of the unstretched cellulose acylate film, and with the temperature difference in the film width direction maintained within 10° C.

As described above, by installing a heating oven between a pair of stretching rollers and longitudinally stretching the film therein, a long-span stretching becomes possible, where the film is pulled slowly to be longitudinally stretched over a long stretching time and a stretching distance, instead of conventional instantaneous longitudinal stretching where the film is pulled in an instant (usually in about 0.5 second).

Moreover, in such long span stretching in the present invention, the in-plane retardation (Re) can be made larger and the thickness direction retardation (Rth) can be made smaller compared to the conventional longitudinal stretching, because the cellulose acylate film is subjected to free end uniaxial stretching in the longitudinal direction of the film to a longitudinal stretching ratio of 1 to 2 while the film is being heated uniformly under the condition of a high temperature (Tc−10° C.<Tc<Tc+70° C.), which is close to the crystallization temperature of the unstretched cellulose acylate film, and with the temperature difference in the film width direction maintained within 10° C. Accordingly, a stretched cellulose acylate film which is preferable as a phase difference film can be produced, the film having an in-plane retardation, Re, of 100 nm or more and with a relationship between the thickness direction retardation, Rth, and Re, which satisfies Rth<(Re/2).

Here, the term "free-end uniaxial stretching" refers to longitudinal stretching carried out in a state wherein the cellulose acylate film can shrink or expand freely in the width direction, without any member disposed between a pair of stretching rollers which supports and touches the cellulose acylate film, such as a conveying roller, a support plate, and a support belt.

A second aspect of the present invention is characterized in that, in the first aspect, the rate at which the cellulose acylate film is heated up to the stretching temperature in the heating oven is 10 to 400° C./min.

The second aspect prescribes the rate at which the cellulose acylate film is heated up to the stretching temperature. The reason for this prescription is that the controllability of Re and Rth in the free-end uniaxial stretching becomes worse when the temperature raising rate is too fast or too slow, with the temperature raising rate in the range of 10 to 400° C./min being preferred.

A third aspect of the present invention is characterized in that, in the first or second aspect, a process of forcibly cooling the longitudinally stretched cellulose acylate film is provided after the free-end uniaxial stretching process, with the film cooling rate of the cellulose acylate film being 10 to 400° C./min.

According to the third aspect, because the process to forcibly cool the cellulose acylate film is provided, the film temperature can be cooled quickly to the stretching temperature or lower, the film having been longitudinally stretched so that the in-plane retardation, Re, is 100 nm or more and a relationship between the thickness direction retardation, Rth, and Re which satisfies Rth<(Re/2). This stops stretching and makes the Rth and Re unlikely to fluctuate.

A fourth aspect of the present invention is characterized in that, in any one of the first to third aspects, hot-air heating is carried out in the heating oven by blowing hot-air toward a film surface at a wind velocity of 0.5 to 20 m/sec from a heating nozzle, with the slit width of the blowout opening being 2 to 10 mm and the distance from the blowout opening to the cellulose acylate film surface being 20 to 500 mm.

The forth aspect prescribes the composition to attain uniform heating of the cellulose acylate in a heating oven at a temperature raising rate of 10 to 400° C./min. It is preferable to blow hot air toward the film surface at a wind velocity of 0.5 to 20 msec from the heating nozzle, with the slit width of the blowout opening being 2 to 10 mm and the distance from the blowout opening to the film surface of the cellulose acylate film being 20 to 500 mm.

A fifth aspect of the present invention is characterized in that, in any one of the first to fourth aspects, the cellulose acylate film is float-conveyed by hot air blown out of a plurality of heating nozzles, the plurality of the heating nozzles being installed at positions above and below the cellulose acylate film and in the longitudinal direction.

The present invention relates to free-end uniaxial stretching without disposing any conveying roller or the like between a pair of stretching rollers and, thus, the cellulose acylate film becomes liable to sag under its own weight between the pair of stretching rollers. If cellulose acylate sags under its own weight, a stretching effect due to the film's own weight becomes liable to occur, making it difficult to attain the target Re and Rth.

Here, according to the fifth aspect, the cellulose acylate film is float-conveyed using the heating nozzles, so the stretching effect due to the film's own weight does not occur any more and the control of the stretching ratio becomes far easier. In addition, because both the function of heating the cellulose acylate film to the stretching temperature and the function of float-conveying the cellulose acylate film are carried out by means of the same heating nozzles, the fifth aspect can contribute to compactification and simplification of the heating oven.

A sixth aspect of the present invention is characterized in that, in the fifth aspect, the floating height in the float-conveying is within 30 mm.

The reason for this prescription is that, with the floating height of a cellulose acylate film being within 30 mm, the planarity of cellulose acylate can be ensured. When strong blowout pressure is applied to the film such that the floating height thereof exceeds 30 mm, a curling force operates to make the film curl upward, contrary to sagging under its own weight. This curling force also causes a stretching effect, making it difficult to ensure planarity. For this reason, it is preferable to float-convey the film while maintaining the planarity thereof by means of blowout pressure of such an extent that will just cancels the film's own weight.

A seventh aspect of the present invention is characterized in that, in any one of the first to sixth aspects, the stretching time in the heating oven is at least 1 second and at most 100 seconds.

The seventh aspect prescribes the preferable stretching time in the present invention. That is, because stretching of the cellulose acylate film is carried out slowly in the heating oven over a long stretching time of at least 1 second and at most 100 seconds, the control of the stretch ratio becomes easier and the target Re and Rth become easier to attain. The stretching time is more preferably at least 15 seconds and at most 90 seconds, even more preferably at least 30 seconds and at most 60 seconds.

An eighth aspect of the present invention is characterized in that, in any one of the first to seventh aspects, the distance between the pair of stretching rollers is at least 1 m and at most 100 m.

The eighth aspect prescribes the preferable distance between the pair of stretching rollers in the present invention. That is, because the distance between the pair of rollers are set at a long span of at least 1 m and at most 100 m, the film between the stretching rollers can be heated uniformly and, because the film can shrink or expand freely, it becomes easier to control the stretch ratio and to attain the target Re and Rth.

A ninth aspect of the present invention is characterized in that, in any one of the first to eighth aspects, stress exerted on the cellulose acylate film in the longitudinal direction between the pair of stretching rollers is set in the range of at least 0.4 MPa and at most 8 MPa.

According to the ninth aspect, by setting the stress exerted on the cellulose acylate film between the pair of stretching rollers in the range of at least 0.4 MPa and at most 8 MPa, the control of the stretch ratio becomes easier. In addition, with stress less than 0.4 MPa, the film sags and, with stress larger than 8 MPa, the film is pulled too much. Consequently, wrinkles become liable to develop on the longitudinally oriented film.

A tenth aspect of the present invention is characterized in that, in any one of the first to ninth aspects, the unstretched cellulose acylate film is a cellulose triacetate film (TAC) formed by a solution film-forming method.

Among the cellulose acylate films, the cellulose triacetate film formed by a solution film-forming method is characterized in that the film before stretching has uniform Re and Rth. Therefore, when a stretched cellulose acylate film is produced which has an in-plane retardation, Re, of 100 nm or more and a relationship between the thickness direction retardation, Rth, and Re which satisfies Rth<(Re/2), uniform characteristics are easily obtained.

Incidentally, the present invention can be applied to a cellulose acylate film formed by melt film formation. However, in the case of the melt film formation, there is an apparatus such as an extruder which imparts pressure to the cellulose acylate film and, also, the viscosity of the cellulose acylate is high when discharged from the die, so a retardation is liable to occur during the film formation. Therefore, in the case of the melt film formation, Re and Rth of the film before stretching are different from those of the film obtained by the solution film-forming method, and it is necessary to set the best longitudinal stretching condition among the conditions of the present invention by taking into account the retardation during film formation. These make the conditions complex.

An eleventh aspect of the present invention provides, in order to accomplish the aforementioned object, a stretched cellulose acylate film, characterized in that the film is produced by a production method according to any one of the first to tenth aspects. Further, a twelfth aspect is characterized in that, in the eleventh aspect, the stretched cellulose acylate film is a phase difference film for a liquid crystal display.

The stretched cellulose acylate film produced according to the production method of the present invention has an in-plane retardation, Re, of 100 nm or more and a relationship between the thickness direction retardation, Rth, and Re which satisfies Rth<(Re/2). Thus, a phase difference film having retardations Re and Rth suitable for respective liquid crystal modes can be provided.

Advantage of the Invention

According to the present invention, a stretched cellulose acylate film can be produced, the film having an in-plane retardation, Re, of 100 nm or more and with a relationship between the thickness direction retardation, Rth, and Re, which satisfies Rth<(Re/2). Therefore, if this stretched cellulose acylate film is used as a phase difference film for a liquid crystal display, a phase difference film having retardations, Re and Rth, suitable for respective liquid crystal modes can be provided.

BRIEF DESCRIPTION OF THE DRAWINGS

FIG. 4 is a table figure summarizing the conditions of Examples and film evaluations.

DESCRIPTION OF SYMBOLS

Figure 1:
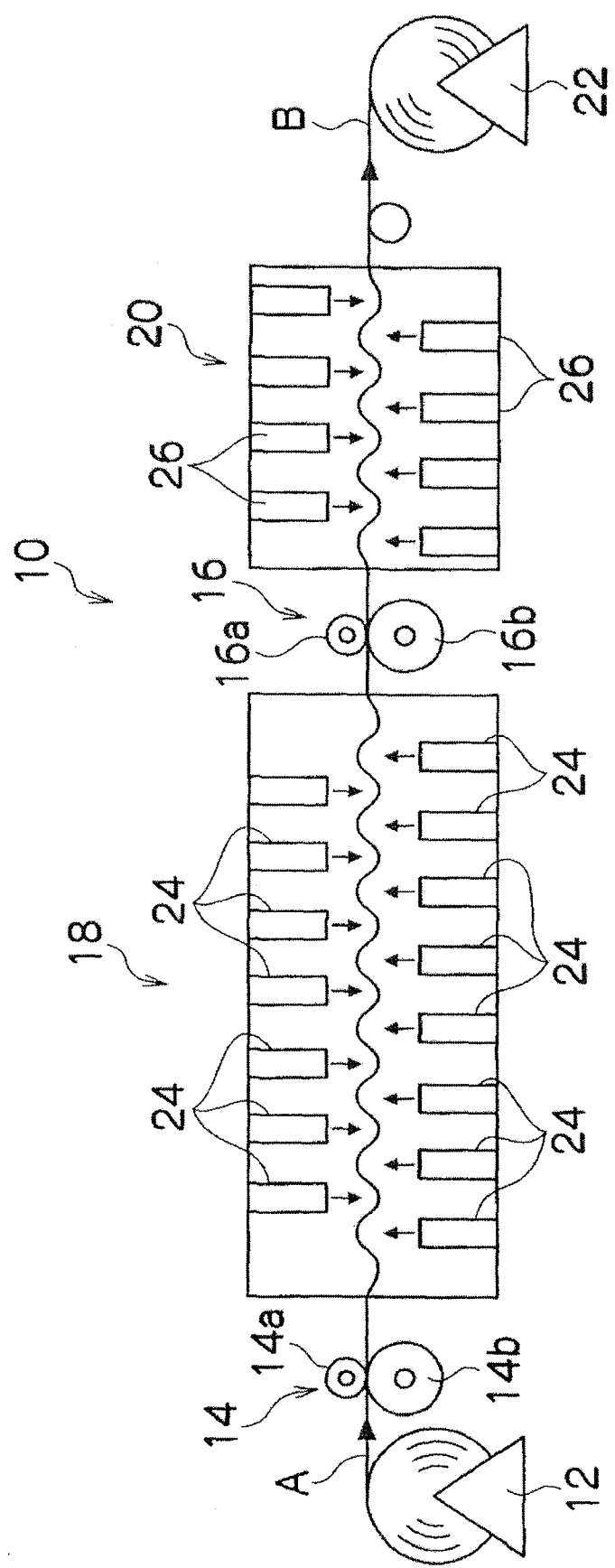
FIG. 1 is a block diagram illustrating an apparatus for a process for producing a stretched cellulose acylate film of the present invention.

10: Production apparatus for a stretched cellulose acylate film
12: Delivery machine
14: Low-speed stretching roller
16: High speed stretching roller
18: Heating oven
20: Cooling oven
22: Wind-up machine
24: Heating nozzle
26: Cooling nozzle
28: Die
30: Casting section
32: Metal support
34: Roller for a metal support
36: Release roller
38, 40: Drying sections
42: Tenter dryer
44: Roller dryer
46: Wind-up machine
A: Cellulose acylate film before longitudinal stretching and during longitudinal stretching
B: Stretched cellulose acylate film after longitudinal stretching

BEST MODE FOR CARRYING OUT THE INVENTION

Hereinafter, preferred embodiments of a stretched cellulose acylate film, a method for producing the same, and a phase difference film will be described according to the attached drawings. Meanwhile, in the present embodiments, an example of producing an unstretched cellulose acylate film by a solution film-forming method is shown. However, the present invention is not limited to this, and the cellulose acylate resin film may also be produced by a melt film-forming method.

FIG. 1 is a block diagram of an apparatus to which a process for producing a stretched cellulose acylate film of the present invention is applied. In addition, a method for producing an unstretched cellulose acylate film before stretching by a solution film-forming method will be described later.

As is shown in FIG. 1, the production apparatus 10 is mainly composed of a feeding apparatus 12 which feeds the unstretched cellulose acylate film A, a pair of stretching rollers 14 and 16, a heating oven 18 disposed between the pair of stretching rollers 14 and 16, a cooling oven 20 disposed after the heating oven 18, and a wind-up machine 22 which winds up the stretched cellulose acylate film B produced.

The pair of stretching rollers 14 and 16 are each formed in a nip roller structure comprising 14a and 14b, and 16a and 16b, respectively. The stretching roller 16 disposed downstream of the heating oven 18 is composed so that its rotating circumferential velocity is faster than that of the stretching roller 14 which is disposed upstream. Then, the unstretched cellulose acylate film A is longitudinally stretched by means of a difference in circumferential velocity of the pair of stretching rollers 14 and 16 in a longitudinal direction, so the stretch ratio becomes 1 to 2. In this case, the stretching time in the heating oven is preferably at least 1 second and at most 100 seconds and the distance between the pair of stretching rollers is preferably at least 1 m and at most 100 m. Herewith, a long-span stretching becomes possible, where the film A is longitudinally stretched by slow pulling over a long stretching time and a long stretching distance, instead of instantaneous longitudinal stretching where the film is pulled in an instant (usually about 0.5 second), such as in the conventional longitudinal stretching.

Further, the stress exerted on the cellulose acylate film A in a longitudinal direction between the pair of stretching rollers 14 and 16 is preferably set in the range of at least 0.4 MPa and at most 8 MPa.

In the heating oven 18, there are disposed a plurality of heating nozzles 24 at positions above and below the cellulose acylate film A which is conveyed and in the film conveying direction (longitudinal direction). From the heating nozzles 24, hot air is blown out toward the cellulose acylate film A. Then, the inside of the heating oven 18 is heated so that, when the crystallization temperature of the cellulose acylate film A is denoted Tc, a stretching temperature in the range of Tc−10° C. to Tc+70° C. is satisfied and a temperature difference in the film width direction becomes within 10° C. In this case, the temperature raising rate, at which the cellulose acylate film A is heated up to the stretching temperature in the heating oven 18, is preferably set at 10 to 400° C./min.

Further, the cellulose acylate film A which passes through the heating oven 18 is float-conveyed by pressure of hot air blown out of the heating nozzles 24, which are disposed above and below the cellulose acylate film A. Herewith, the free-end uniaxial stretching of the cellulose acylate film A becomes possible in a state where a free end is formed in the width direction. In this case, the floating height when float-conveying the cellulose acylate film A is within 30 mm.

Figure 2:
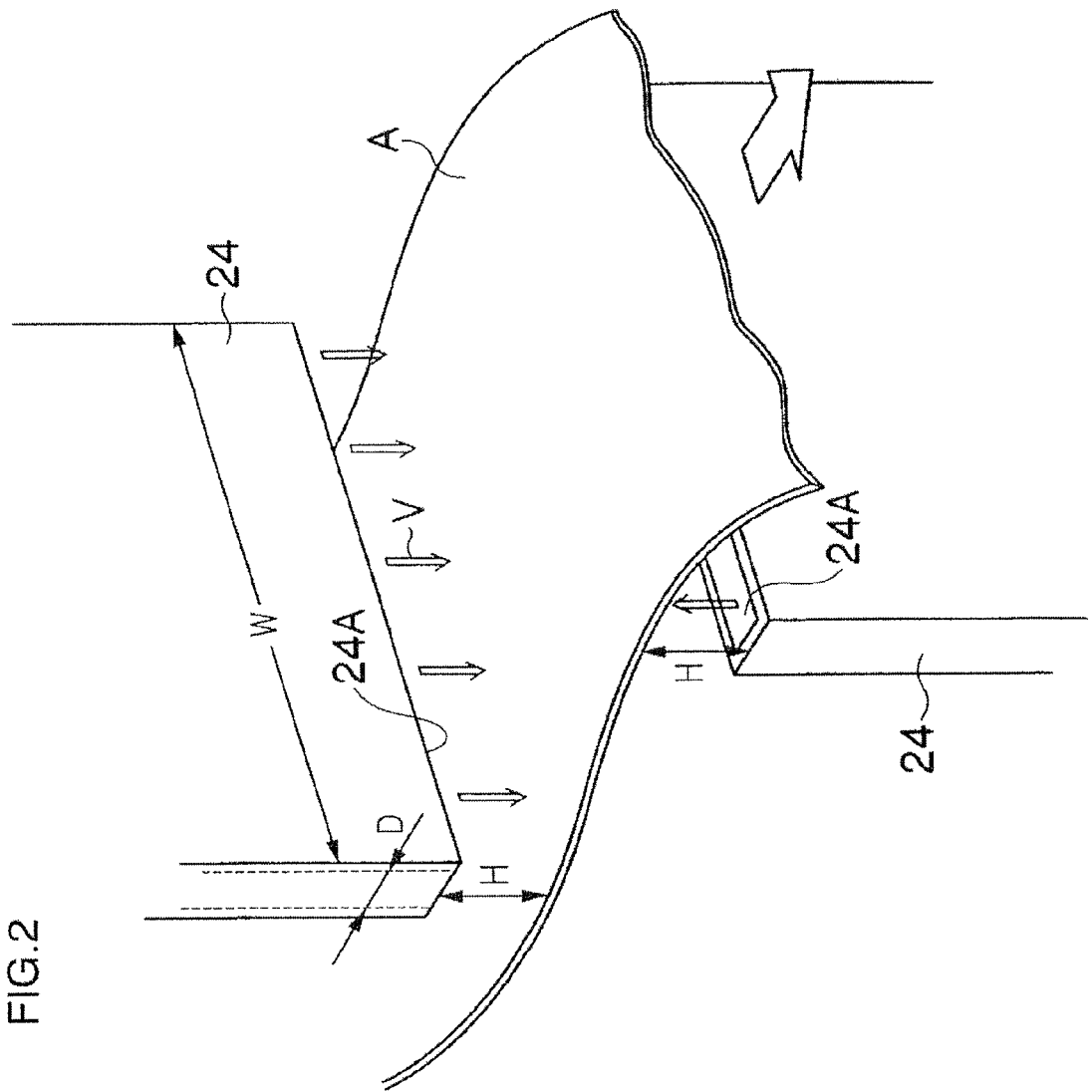
FIG. 2 is an illustration diagram illustrating heating nozzles installed in a heating oven.

As is shown in FIG. 2, the heating nozzle 24 is formed as a slit-shaped nozzle which is long in the film width direction. The width W (length in the film width direction) of the blowout opening 24A through which hot air flowing through the heating nozzle 24 is blown is formed the same as or more than the film width. In addition, the slit width D of the blowout opening 24A is preferably formed in the range of 2 to 10 mm. Further, the distance H from the blowout opening to the surface of the cellulose acylate film A is preferably in the range of 20 to 500 mm. And it is preferable that hot-air is blown from such a heating nozzle 24 toward the surface of the cellulose acylate film A at a wind velocity of 0.5 to 20 m/sec. The temperature of the hot air blown out of the heating nozzle 24 is such that the film temperature can be heated up to the range of Tc−10° C. to Tc+70° C.

In the cooling oven 20, there are disposed a plurality of cooling nozzles 26 at positions above and below the stretched cellulose acylate film B, which was longitudinally stretched in the heating oven 18 and is conveyed, and in the film conveying direction (longitudinal direction). And, from the cooling nozzles 26, cold air is blown out toward the stretched cellulose acylate film B. Regarding structure of the cooling nozzles 26, there can be employed a structure similar to the heating nozzles 24 as described with FIG. 2 above.

In this way, by disposing the cooling oven 20 after the heating oven 18, the stretched cellulose acylate film B which has gone through the free-end uniaxial stretching is immediately cooled below the stretching temperature in a state of being float-conveyed. This causes stretching to stop and, thus, the Rth and Re become less liable to fluctuate. At the same time, because the film is float-conveyed, the film surface is less liable to be scratched compared to a case where a conveying roller is present.

The stretched cellulose acylate film B, cooled nearly to room temperature in the cooling oven 20, is wound on the wind-up machine 22. Herewith, there can be produced a stretched cellulose acylate film B having an in-plane retardation, Re, of 100 nm or more and a relationship between the thickness direction retardation, Rth, and Re, which satisfies Rth<(Re/2). Therefore, if this stretched cellulose acylate film B is used for a liquid crystal display as, for example, a phase difference film, there can be provided a phase difference film having retardations, Re and Rth, suitable for the respective liquid crystal modes.

Meanwhile, in FIG. 1, the stretching roller 16 is disposed between the heating oven 18 and the cooling oven 20, namely before the cooling oven 20, but may be disposed after the cooling oven 20.

Hereinafter, preferred conditions for the cellulose acylate, which is a raw material when producing the unstretched cellulose acylate film A by a solution film-forming method, before carrying out longitudinal stretching in the heating oven 18 will be described. A preferred aspect of a process of the solution film-forming method will also be described.

[Cellulose Acylate (Raw Material)]

The cellulose acylate film A comprises, as the main component polymer, cellulose acylate. Here, the term "the main component polymer" refers, when the cellulose acylate film A comprises a single polymer, to that polymer and, when the film A comprises a plurality of polymers, to a polymer of the highest mass fraction among the constituent polymers.

As the cellulose acylate used when producing the cellulose acylate film, there may be used a powdery or granular material. A pelletized material may also be used. Further, the moisture content of the cellulose acylate is preferably 1.0% by mass or less, more preferably 0.7% by mass or less, most preferably 0.5% by mass or less. Furthermore, depending on the situation, the moisture content is preferably 0.2% by mass or less. When the moisture content of the cellulose acylate is not in the preferred range, it is preferable to use the cellulose acylate after drying by heating or the like.

These polymers may be used singly or in a combination of two or more kinds.

As the cellulose acylate, there may be mentioned a cellulose acylate compound and a compound having an acyl substituted cellulose skeleton, obtained by introducing a functional group biologically or chemically using cellulose as a raw material.

The cellulose acylate is an ester of cellulose and a carboxylic acid. As the carboxylic acid which constitute the ester, aliphatic acids having 2 to 22 carbon atoms are preferable, the most preferable being lower aliphatic acids having 2 to 4 carbon atoms.

In the cellulose acylate, all or part of the hydrogen atoms of the hydroxyl groups present at the 2-, 3-, and 6-positions of a glucose unit which constitutes cellulose are substituted with acyl groups. Examples of the acyl group include, for example, an acetyl group, a propionyl group, a butyryl group, an isobutyryl group, a pivaloyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, a cyclohexancarbonyl group, an oleoyl group, a benzoyl group, a naphthylcarbonyl group, and a cinnnamoyl group. As the acyl group, preferable are an acetyl group, a propionyl group, a butyryl group, a dodecanoyl group, an octadecanoyl group, a pivaloyl group, an oleoyl group, a benzoyl group, a naphthylcarbonyl group, and a cinnnamoyl group, with most preferable being an acetyl group, a propionyl group, and a butyryl group.

The cellulose acylate may be substituted with a plurality of acyl groups and includes, specifically, cellulose acetate propionate, cellulose acetate butyrate, cellulose acetate butyrate propionate, cellulose butyrate propionate, and the like.

As the cellulose acylate which constitutes the cellulose acylate film, cellulose acetate having an ester with acetic acid is especially preferable and, from the viewpoint of solubility in a solvent, cellulose acetate having a degree of acetyl substitution of 2.70 to 2.87 is more preferable, and cellulose acetate having a degree of acetyl substitution of 2.80 to 2.86 is most preferable. The term "degree of substitution" used here refers to the degree to which the hydrogen atoms of the hydroxyl groups present at the 2-, 3-, and 6-positions of a glucose unit constituting cellulose are substituted. When the hydrogen atoms of the hydroxyl groups present at the 2-, 3-, and 6-positions are substituted, the degree of substitution is 3.

With regard to a synthetic method of producing cellulose acylate, the basic principle is described in Nakahiko Migita et al., "Wood Chemistry", pp. 180-190 (Kyoritsu Shuppan Co., Ltd, 1968). As a representative synthetic method of producing cellulose acylate, there may be mentioned a liquid-phase acylation method by use of carboxylic acid anhydride-carboxylic acid-sulfuric acid catalyst. Specifically, first, cellulose raw materials such as cotton linters and wood pulp are pretreated with a suitable amount of carboxylic acid such as acetic acid and, then, are introduced into an acylation mixed solution, which has been cooled beforehand, to be esterified to synthesize complete cellulose acylate (total degree of acyl substitution at the 2-, 3-, and 6-positions is nearly 3.00). The acylation mixed solution generally comprises a carboxylic acid as a solvent, a carboxylic acid anhydride as an esterifying agent, and sulfuric acid as a catalyst. In addition, it is common to use the carboxylic acid anhydride in a stoichiometrically excess amount relative to the total of cellulose and the moisture present in the system, which react with the anhydride.

Subsequently, after completion of the acylation reaction, water or water-containing acetic acid is added in order to hydrolyze excess carboxylic acid anhydride remaining in the system. Further, in order to neutralize a part of the esterification catalyst, an aqueous solution comprising a neutralizing agent (for example, a carbonate salt, an acetate salt, a hydroxide, or an oxide of calcium, magnesium, iron, aluminum, or zinc) may be added. Furthermore, the complete cellulose acylate obtained is saponified and aged by keeping the reaction mixture at 20 to 90° C. in the presence of a small amount of an acylation reaction catalyst (in general, the remaining sulfuric acid) to be modified to cellulose acylate having desired degrees of acyl substitution and polymerization. At the time when desired cellulose acylate is obtained, the catalyst remaining in the system is completely neutralized using a neutralizing agent or the like, or, without neutralization of the catalyst, the cellulose acylate solution is poured into water or dilute acetic acid (alternatively, water or dilute acetic acid is poured into the cellulose acylate solution) to separate cellulose acylate, which is subjected to washing and stabilization treatment to obtain the desired cellulose acylate.

The degree of polymerization of the cellulose acylate is, in terms of a viscosity-average degree of polymerization, preferably 150 to 500, more preferably 200 to 400, even more preferably 220 to 350. The viscosity-average degree of polymerization can be measured according to a description by Uda et al. on an intrinsic viscosity method (Kazuo Uda and Hideo Saito, Journal of the Society of Fiber Science and Technology, Japan, Vol. 18, No. 1, pp. 105-120, 1962). A method for measuring the viscosity-average degree of polymerization is also described in Japanese Patent Application Laid-Open No. H9-95538.

In addition, the cellulose acylate containing only a small amount of a low-molecular component has a higher average molecular weight (degree of polymerization) but the viscosity is lower than that of the usual cellulose acylate. Such cellulose acylate having only a small amount of low-molecular component can be obtained by removing the low-molecular component from cellulose acylate synthesized by a usual method. The removal of the low-molecular component can be carried out by washing cellulose acylate with a suitable organic solvent. Also, the cellulose acylate containing only a small amount of low-molecular component can be obtained by synthesis. When cellulose acylate containing only a small amount of low molecular component is synthesized, the amount of sulfuric acid catalyst in the acylation reaction is preferably adjusted to 0.5 to 25 parts by mass relative to 100 parts by mass of cellulose. With the amount of sulfuric acid catalyst in the range, cellulose acylate which is also preferable in terms of molecular weight distribution (having a uniform molecular weight distribution) can be synthesized.

The raw material cotton and a synthetic method of producing a cellulose ester are also described in the JIII Journal of Technical Disclosure (Journal of Technical Disclosure No. 2001-1745, Mar. 15 (2001), Japan Institute of Invention and Innovation, pp. 7-12).

<Process for Solution Film-Forming Method>

The cellulose acylate film A can be prepared from a solution comprising cellulose acylate and various additives by a solution film-forming method.

[Cellulose Acylate Solution]

(Solvent)

When the cellulose acylate film A is prepared by a solution film-forming method, a cellulose acylate solution is prepared. Hereat, as a main solvent used for the cellulose acylate solution, there can preferably be used an organic solvent which is a good solvent for the cellulose acylate. As such an organic solvent, one having a boiling point of 80° C. or lower is more preferable from the viewpoint of drying load reduction. The boiling point of the organic solvent is even more preferably 10 to 80° C., especially preferably 20 to 60° C. In addition, depending on the situation, an organic solvent having a boiling point of 30 to 45° C. can also be used favorably as the main solvent.

Such main solvents include halogenated hydrocarbons, esters, ketones, ethers, alcohols, and hydrocarbons, and these may have branched structures or cyclic structures. Also, the main solvents may contain any two or more functional groups chosen from ester, ketone, ether, and alcohol (namely, —O—, —CO—, —COO—, and —OH). Further, a hydrogen atom in the hydrocarbon portion of the ester, ketone, ether, and alcohol may be substituted with a halogen atom (especially, a fluorine atom). Meanwhile, the term "main solvent" refers, when a solution comprises a single solvent, to that solvent and, when a solution comprises a plurality of solvents, to a solvent which has the highest mass fraction among the constituent solvents.

As the halogenated hydrocarbons, chlorinated hydrocarbons are more preferable. For example, there may be mentioned dichloromethane and chloroform, with dichloromethane being even more preferable.

The esters include, for example, methyl formate, ethyl formate, methyl acetate, and ethyl acetate.

The ketones include, for example, acetone and methyl ethyl ketone.

The ethers include, for example, diethyl ether, methyl tert-butyl ether, diisopropyl ether, dimethoxymethane, 1,3-dioxolane, 4-methyldioxolane, tetrahydrofuran, methyltetrahydrofuran, and 1,4-dioxane.

The alcohols include, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, and 2,2,3,3-tetrafluoro-1-propanol.

The hydrocarbons include, for example, n-pentane, cyclohexane, n-hexane, benzene, toluene, and xylene.

The organic solvents having two or more kinds of functional groups include, for example, 2-ethoxyethyl acetate, 2-methoxyethanol, 2-butoxyethanol, and methyl acetoacetate.

In the cellulose acylate film A, it is desirable, from the viewpoint of reducing a delamination load from a band, that an alcohol be contained in an amount of preferably 5 to 30% by mass, more preferably 7 to 25% by mass, and even more preferably 10 to 20% by mass of the total solvents.

Examples of a combination of organic solvents preferably employed as a solvent for the cellulose acylate solution, which is used for production of the cellulose acylate film A, include the following. However, the combination which can be employed in the present invention is not limited to these. In addition, the numbers representing the ratio means parts by mass:

(1) dichloromethane/methanol/ethanol/butanol=80/10/5/5
(2) dichloromethane/methanol/ethanol/butanol=80/5/5/10
(3) dichloromethane/isobutyl alcohol=90/10
(4) dichloromethane/acetone/methanol/propanol=80/5/5/10
(5) dichloromethane/methanol/butanol/cyclohexane=80/8/10/2
(6) dichloromethane/methyl ethyl ketone/methanol/butanol=80/10/5/5
(7) dichloromethane/butanol=90/10
(8) dichloromethane/acetone/methyl ethyl ketone/ethanol/butanol=68/10/10/7/5
(9) dichloromethane/cyclopentanone/methanol/pentanol=80/2/15/3
(10) dichloromethane/methyl acetate/ethanol/butanol=70/12/15/3

(11) dichloromethane/methyl ethyl ketone/methanol/butanol=80/5/5/10
(12) dichloromethane/methyl ethyl ketone/acetone/methanol/pentanol=50/20/15/5/10
(13) dichloromethane/1,3-dioxolane/methanol/butanol=70/15/5/10
(14) dichloromethane/dioxane/acetone/methanol/butanol=75/5/10/5/5
(15) dichloromethane/acetone/cyclopentanone/ethanol/isobutyl alcohol/cyclohexane=60/18/3/10/7/2
(16) dichloromethane/methyl ethyl ketone/acetone/isobutyl alcohol=70/10/10/10
(17) dichloromethane/acetone/ethyl acetate/butanol/hexane=69/10/10/10/1
(18) dichloromethane/methyl acetate/methanol/isobutyl alcohol-65/15/10/10
(19) dichloromethane/cyclopentanone/ethanol/butanol=85/7/3/5
(20) dichloromethane/methanol/butanol=83/15/2
(21) dichloromethane=100
(22) acetone/ethanol/butanol=80/15/5
(23) methyl acetate/acetone/methanol/butanol=75/10/10/5
(24) 1,3-dioxolane=100

Also, details of a case where a non-halogenated organic solvent is used as the main solvent are described in the JIII Journal of Technical Disclosure (Journal of Technical Disclosure No. 2001-1745, Mar. 15 (2001), Japan Institute of Invention and Innovation) and can be suitably applied in the present invention.

(Solution Concentration)

The concentration of cellulose acylate in the cellulose acylate solution to be prepared is preferably 5 to 40% by mass, more preferably 10 to 30% by mass, most preferably 15 to 30% by mass.

The concentration of cellulose acylate may be adjusted to a predetermined concentration at the stage of dissolving cellulose acylate in the solvent. Also, a solution of low concentration (for example, 4 to 14% by mass) may be prepared beforehand, which is, thereafter, concentrated by evaporation of the solvent or the like. Further, a high concentration solution may be prepared beforehand, which is, thereafter, diluted. Furthermore, the concentration of cellulose acylate can be reduced by addition of additives.

(Additives)

The cellulose acylate solution may contain various liquid or solid additives suitable for the intended use in each preparation step. Examples of the additives include a plasticizer (a preferable amount added relative to the amount of cellulose acylate (the same applies hereinafter): 0.01 to 10% by mass), an ultraviolet absorber (0.001 to 1% by mass), fine particle powder having an average particle size of 5 to 3000 nm (0.001 to 1% by mass), a fluorinated surface active agent (0.001 to 1% by mass), a release agent (0.0001 to 1% by mass), a deterioration preventing agent (0.0001 to 1% by mass), an optical anisotropy controlling agent (0.01 to 10% by mass), and an infrared absorber (0.001 to 1% by mass).

The plasticizer and the optical anisotropy controlling agent are organic compounds having a molecular weight of 3000 or less, and are preferably compounds having both a hydrophobic portion and a hydrophilic portion. These compounds orient themselves between the cellulose acylate chains and make the retardation values change. Further, these compounds can improve hydrophobicity of the film and reduce a change in the retardation due to humidity. Additionally, by using an ultraviolet absorber and an infrared absorber in combination, wavelength dependence of the retardation can be controlled effectively. As the additives, preferable are those which do not substantially volatilize during the drying process.

From the viewpoint of reducing a change in the retardation due to humidity, the amount added of these additives is preferably larger. However, with an increase in the amount added, lowering of the glass transition temperature (Tg) of the cellulose acylate film A and a problem of volatilization of the additive in the film production process become liable to occur. Therefore, when cellulose acetate, which is more preferably used in the present invention, is employed, the amount added of the additive having a molecular weight of 3000 or less is, relative to the cellulose acylate, preferably 0.01 to 30% by mass, more preferably 2 to 30% by mass, and even more preferably 5 to 20% by mass.

Regarding a plasticizer which can be used suitably for the cellulose acylate film A, there is a description in Japanese Patent Application Laid-Open No. 2001-151901. Also, regarding an infrared absorbing agent, there is a description in Japanese Patent Application Laid-Open No. 2001-194522. The time to add the additive can be determined suitably depending on the kind of additive. In addition, with regard to the additive, there is also a description in the JIII Journal of Technical Disclosure (Journal of Technical Disclosure No. 2001-1745, Mar. 15 (2001), Japan Institute of Invention and Innovation), pp. 16-22.

(Preparation of Cellulose Acylate Solution)

The preparation of a cellulose acylate solution can be carried out, for example, according to a preparation method described in Japanese Patent Application Laid-Open No. 2005-104148, pp. 106-120. Specifically, the cellulose acylate and a solvent are mixed and stirred for the cellulose acylate to get swollen, and, depending on the situation, the mixture is subjected to cooling, heating, or the like for the cellulose acylate to get dissolved, and, thereafter the mixture is filtered. In this way, a cellulose acylate solution can be obtained.

[Casting Process, Drying Process]

Figure 3:
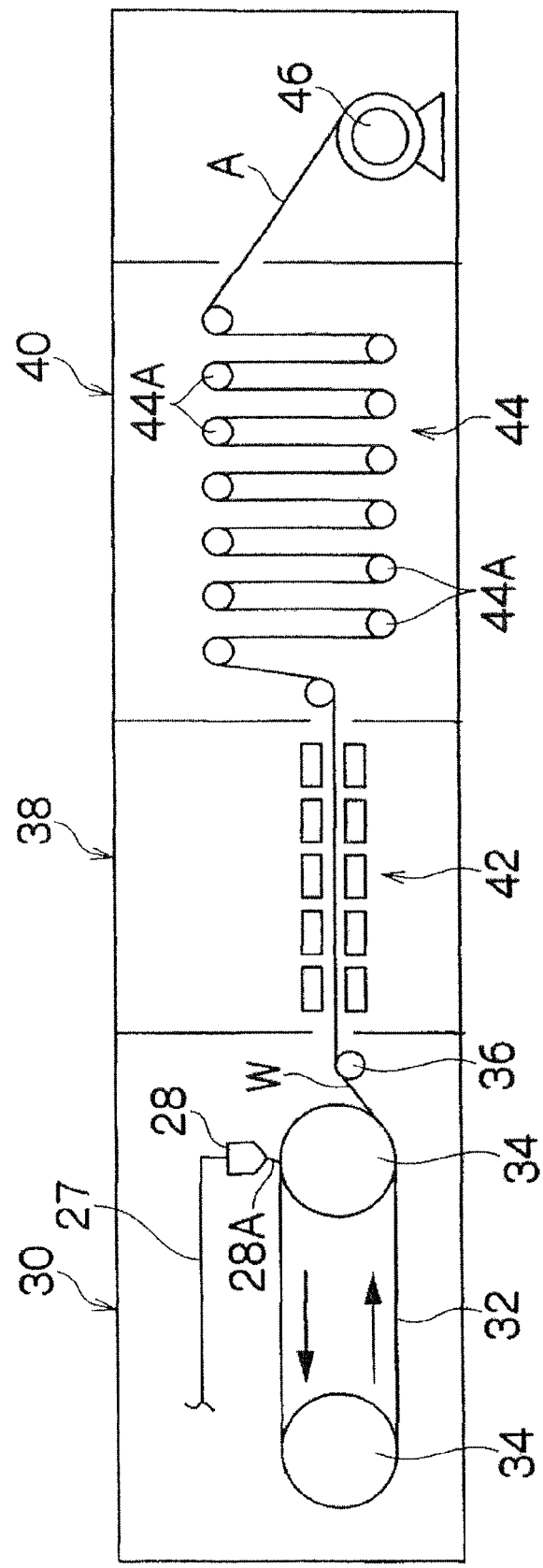
FIG. 3 is an illustration diagram of a solution film-forming method whereby an unstretched cellulose acylate film before stretching is produced.

The cellulose acylate film A can be produced by using a conventional solution casting film-forming apparatus according to a conventional solution film-forming method. Specifically, a dope (a cellulose acylate solution) prepared by a solubiling apparatus (tank) is stored once in a storage tank after filtration and a final adjustment can be carried out by removing the foams contained in the dope. The dope is maintained at 30° C. and, from a dope discharge opening, is fed to a die 28 through a feed pipe 27 shown in FIG. 3 by means of a pressure metering gear pump, which can feed a liquid quantitatively with high precision by adjusting the number of revolutions. And, the dope is cast uniformly through a cap 28A (slit) of the die 28 on a metal support 32 (casting band) in the casting section 30, which is travelling endlessly. The metal support 32 is formed in an endless shape and is looped around a pair of separated rollers 34. The dope cast on the metal support 32 is peeled as a half-dry dope film W (may also be referred to as a web) from the metal support 32, by means of a release roller 36, at a peel point where the metal support 32 has made nearly a circuit. The dope film W is subsequently conveyed to the drying sections 38 and 40 to be dried (a drying process). As drying sections 38 and 40, as shown in FIG. 3, for example, there may preferably be used a tenter dryer 42 whereby the dope film W is dried with its both ends in the width direction being gripped and a roller dryer 44 whereby the dope film W is dried while being conveyed by a plurality of rollers 44A.

Details of the casting process and drying process are also described in Japanese Patent Application Laid-Open No. 2005-104148, pp. 120-146 and can suitably be applied to the present invention.

The amount of a residual solvent in the film which has undergone drying is preferably 0 to 2% by mass, more preferably 0 to 1% by mass. After drying, the film may be wound up once by the wind-up machine 46 and, thereafter, the longitudinal stretching process may be carried out in the heating oven 18 shown in FIG. 1. Or, without winding up the film once, the longitudinal stretching process in the heating oven 18 of FIG. 1 may be carried out continuously from FIG. 3.

The width of the cellulose acylate film A before longitudinal stretching is preferably 0.5 to 5 m, more preferably 0.7 to 3 m. In addition, when the film is wound up once, the take-up length is preferably 300 to 30000 m, more preferably 500 to 10000 m, even more preferably 1000 to 7000 m.

[Longitudinal Stretching in Heating Oven]

As was described with FIG. 1, when the unstretched cellulose acylate film A prepared is longitudinally stretched in the longitudinal direction by pulling by means of a difference in circumferential velocity between a pair of stretching rollers 14 and 16, the cellulose acylate film A is subjected to free-end uniaxial stretching to a longitudinal stretch ratio of 1 to 2 in a heating oven 18 installed between a pair of rollers 14 and 16, wherein the film is being heated to a stretching temperature in the range of Tc−10° C. to Tc+70° C., Tc being the crystallization temperature of the film A, and the temperature difference in the film width direction being maintained within 10° C. In addition, further preferable conditions and the like have already been described and, to avoid overlap, the explanation will be omitted here.

[Cooling in Cooling Oven]

The stretched cellulose acylate film, which was subjected to free-end uniaxial stretching in the heating oven 18, is cooled forcibly to around room temperature by passing through the cooling oven 20 and is wound up by the wind-up machine 22. In this way, a stretched cellulose acylate film B can be produced, the film B having an in-plane retardation, Re, of 100 nm or more and a relationship between the thickness direction retardation, Rth, and Re, which satisfies Rth<(Re/2).

[Moisture Permeability]

It is preferable that such a stretched cellulose acylate film B has moisture permeability of 100 to 400 g/(m²·day) at 40° C. and relative humidity of 90%, and a change in the moisture permeability after storing at 60° C. and relative humidity of 95% for 1000 hours is −100 g/(m²·day) to 10 g/(m²·day).

Here, the term "moisture permeability" refers to a change in the mass (g/(m²·day)) of a cup containing calcium chloride and covered with the film, before and after the whole is placed in an airtight container and retained therein under a condition of 40° C. and relative humidity of 90% for 24 hours. The moisture permeability increases with rise in temperature and also increases with increase in the moisture content but, at any temperature and humidity that are employed, the magnitude relation of the moisture permeability between films remains unchanged. Thus, in the present invention, the value of the aforementioned change in the mass at 40° C. and relative humidity of 90% was employed as a standard.

The moisture permeability of the stretched cellulose acylate film B is preferably 100 to 400 g/(m²·day), more preferably 120 to 350 g/(m²·day), even more preferably 150 to 300 g/(m²·day).

In addition, the moisture permeability was measured by the above method before and after the film B was retained at 60° C. and relative humidity of 95% for 1000 hours, and the value obtained by subtracting the moisture permeability after the retainment from the moisture permeability before the retainment was termed "a change in moisture permeability after retaining at 60° C. and relative humidity of 95% for 1000 hours".

The change in moisture permeability after retaining the stretched cellulose acylate film B at 60° C. and relative humidity of 95% is −100 g/(m²·day) to 10 g/(m²·day), preferably −50 to 5 g/(m²·day), more preferably −20 to 0 g/(m²·day).

Further, because the moisture permeability decreases with increase in film thickness and increases with decrease in film thickness, the measured moisture permeability is first multiplied by the measured film thickness, and, then, the product is divided by 80. This value is termed the "moisture permeability in terms of a film thickness of 80 μm" in the present invention.

The moisture permeability of the stretched cellulose acylate film B in terms of a film thickness of 80 μm is preferably 100 to 420 g/(m²·day), more preferably 150 to 400 g/(m²·day), even more preferably 180 to 350 g/(m²·day)

When a stretched cellulose acylate film B which satisfies this condition on the moisture permeability is used, there can be provided a polarizing plate having excellent durability to moisture, or heat and humidity, as well as a liquid crystal display having high reliability.

[Surface Treatment]

By appropriately providing a surface treatment to the stretched cellulose acylate film B, improvement in adhesion thereof with each functional layer (for example, an undercoat layer, a back layer, and an optically anisotropic layer) becomes possible. The surface treatment includes a glow discharge treatment, an ultraviolet irradiation treatment, a corona treatment, a flame treatment, and a saponification treatment (acid saponification treatment and alkaline saponification treatment), with, especially, the glow discharge treatment and alkaline saponification treatment being preferable. Here, the term "glow discharge treatment" means a treatment which provides a plasma treatment to the film surface in the presence of a plasma excitation gas. Details of these surface treatment methods are described in the JIII Journal of Technical Disclosure (Journal of Technical Disclosure No. 2001-1745, Mar. 15 (2001), Japan Institute of Invention and Innovation) and can be appropriately used.

In order to improve adhesion between the film surface and functional layers, an undercoat layer (adhesive layer) may also be disposed on the stretched cellulose acylate film B, in addition to the surface treatment or instead of the surface treatment. There is a description on the undercoat layers in the JIII Journal of Technical Disclosure (Journal of Technical Disclosure No. 2001-1745, Mar. 15 (2001), Japan Institute of Invention and Innovation), p. 32 and these can be appropriately used. Also, the functional layers disposed on the stretched cellulose acylate film B are described in the JIII Journal of Technical Disclosure (Journal of Technical Disclosure No. 2001-1745, Mar. 15 (2001), Japan Institute of Invention and Innovation), pp. 32-45 and those described herein can be appropriately used.

<Optical Compensation Film>

The thus produced stretched cellulose acylate film B of the present invention can also be used as an optical compensation film. In addition, the term "optical compensation film" refers to an optical material which is used for a display device such as a liquid crystal display and has optical anisotropy. The term is synonymous with a phase difference film, a phase difference plate, an optical compensation sheet, and the like. In a liquid crystal display, the optical compensation film is used for the purpose of improving the contrast of the display screen image and bettering the viewing angle property and the color shade.

The stretched cellulose acylate film B of the present invention can also be used as an optical compensation film as it is. Further, it may also be used as an optical compensation film by appropriately adjusting Re and Rth by laminating a plurality of the stretched cellulose acylate films B of the present invention or by laminating the stretched cellulose acylate film B with a film not of the present invention. Lamination of the films can be carried out using a tackiness agent and an adhesive agent.

Further, depending on the situation, the stretched cellulose acylate film B of the present invention may be used as a support of an optical compensation film. By disposing thereon an optical anisotropic layer comprising liquid crystal or the like, the laminate may also be used as an optical compensation film. The optically anisotropic layer applied to the optical compensation film may, for example, be formed from a composition comprising a liquid crystalline compound or may be formed from a cellulose acylate film having birefringence.

As the liquid crystalline compound, preferable is a discotic liquid crystalline compound or a rod-like liquid crystalline compound.

[Discotic Liquid Crystalline Compound]

Examples of the discotic liquid crystalline compound which can be used as the liquid crystalline compound in the present invention include compounds described in various literatures (for example, C. Destrade et al., Mol. Cryst. Liq. Cryst., vol. 71, page 111 (1981); Kikan Kagaku Sosetsu, No. 22, Chemistry of Liquid Crystals, The Chemical Society of Japan Ed., Chapter 5 and Section 2 of Chapter 10 (1994); B. Kohne et al., Angew. Chem. Soc. Chem. Comm., page 1794 (1985); J. Zhang et al., J. Am. Chem. Soc., vol. 116, page 2655 (1994)).

In the optically anisotropic layer, the discotic liquid crystalline molecules are preferably fixed in an oriented state and are most preferably fixed by a polymerization reaction. In addition, polymerization of the discotic liquid crystalline molecules is described in Japanese Patent Application Laid-Open No. H8-27284. In order to have the discotic liquid crystalline molecules fixed by polymerization, it is necessary to have a polymerizable group bound, as a substituent, to the disk-shaped core of the discotic liquid crystalline molecule. However, if the polymerizable group is bonded directly to the disk-shaped core, it becomes difficult to keep the oriented state in the polymerization reaction. Therefore, a linking group is introduced between the disk-shaped core and the polymerizable group. A discotic liquid crystalline molecule having a polymerizable group is disclosed in Japanese Patent Application Laid-Open No. 2001-4387.

[Rod-Shaped Liquid Crystalline Compound]

Examples of the rod-shaped liquid crystalline compound which can be used as the liquid crystalline compound include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexylbenzonitriles. In addition, as the rod-shaped liquid crystalline compound, there may be used not only the low molecular liquid crystalline compounds such as above but also polymeric liquid crystalline compounds.

In the optical anisotropic layer, the rod-shaped liquid crystalline molecules are preferably fixed in an oriented state and are most preferably fixed by a polymerization reaction. Examples of a polymerizable rod-shaped liquid crystalline compound which can be used in the present invention include compounds described in, for example, Makromol. Chem., vol. 190, page 2255 (1989); Advanced Materials, vol. 5, page 107 (1993); U.S. Pat. Nos. 4,683,327, 5,622,648, 5,770,107; WO Nos. 95/22586, 95/24455, 97/00600, 98/23580, 98/52905; Japanese Patent Application Laid-Open Nos. H1-272551, H6-16616, H7-110469, H11-80081, and Japanese Patent Application Laid-Open No. 2001-328973.

(Optically Anisotropic Layer Comprising Polymer Film)

The optical anisotropic layer may be formed from a polymer film. The polymer film can be formed from a polymer which can exhibit optical anisotropy. Examples of a polymer which can exhibit optical anisotropy include polyolefins (for example, polyethylene, polypropylene, and a norbornene-based polymer), polycarbonate, polyarylate, polysulfone, polyvinyl alcohol, polymethacrylic acid esters, polyacrylic acid esters, and cellulose esters (for example, cellulose triacetate and cellulose diacetate). Also, as the polymer, copolymers or polymer mixtures of these polymers may be used.

<Polarizing Plate>

The stretched cellulose acylate film B of the present invention and an optical compensation film using the same can be used as a protective film for a polarizing plate. The polarizing plate comprises a polarizing film and two polarizing plate protective films (cellulose acylate film) which protect both surfaces of the polarizing film. The stretched cellulose acylate film B or the optical compensation film can be used as at least one side of the polarizing plate protective films. Also, the stretched cellulose acylate film B of the present invention can be laminated roll-to-roll with the polarizing film using an adhesive agent.

When the stretched cellulose acylate film B is used as the polarizing plate protective film, it is preferable to have the film subjected to a surface treatment (also described in Japanese Patent Application Laid-Open Nos. H6-94915 and H6-118232) to be hydrophilized. The film is preferably subjected to, for example, a glow discharge treatment, a corona discharge treatment, or an alkaline saponification treatment. Especially, as the surface treatment, an alkaline saponification treatment is most preferably used.

Further, as the polarizing film, for example, one obtained by immersing a polyvinyl alcohol film in an iodine solution, followed by stretching, can be used. When a polarizing film obtained by immersing the polyvinyl alcohol film in an iodine solution, followed by stretching, is used, the surface-treated surface of the stretched cellulose acylate film B can be directly laminated on both surfaces of the polarizing film using an adhesive agent.

In the present invention, it is preferable that the stretched cellulose acylate film B is directly laminated with the polarizing film as described above. As the adhesive agent, an aqueous solution of polyvinyl alcohol or polyvinyl acetal (for example, polyvinyl butyral), or a latex of a vinyl-based polymer (for example, polybutyl acrylate) can be used. An especially preferable adhesive agent is an aqueous solution of completely saponified polyvinyl alcohol.

In general, the liquid crystal display has four polarizing plate protective films because a liquid crystal cell is diposed between two polarizing plates. The stretched cellulose acylate film B can be used suitably for any of the four polarizing plate protective films. Above all, it is especially preferable that the stretched cellulose acylate film B is used as an outer protective film which is not disposed between the polarizing film and the liquid crystal layer (liquid crystal cell) in the liquid crystal display. In this case, a transparent hard coat layer, an antiglare layer, an antireflection layer, and the like may be provided on the stretched cellulose acylate film B.

<Liquid Crystal Display>

The stretched cellulose acylate film B of the present invention, and the optical compensation film and polarizing plate which utilize the same can be used for liquid crystal displays of various display modes. The stretched cellulose acylate film B and the optical compensation film utilizing the same have low moisture permeability. This moisture permeability does not increase even if the films are exposed to heat and humidity and, thus, in a polarizing plate using the stretched cellulose acylate film B, decrease in degree of polarization can be suppressed over a long period of time. Therefore, a liquid crystal display having high reliability can be provided.

Hereinafter, respective liquid crystal modes in which these films are used will be described. These liquid crystal displays may be any one of transmissive, reflective, and semi-transmissive modes.

(TN-mode Liquid Crystal Display)

The stretched cellulose acylate film B of the present invention may be used as a support of the optical compensation film for a TN-mode liquid crystal display having a TN-mode liquid crystal cell. The TN mode liquid crystal cell and the TN-mode liquid crystal display are well known from long ago. The optical compensation film used for the TN-mode liquid crystal display is described in each gazette of Japanese Patent Application Laid-Open No. H3-9325, Japanese Patent Application Laid-Open No. H6-148429, Japanese Patent Application Laid-Open No. H8-50206, and Japanese Patent Application Laid-Open No. H9-26572; and, in addition, in articles by Mori et al. (Jpn. J. Appl. Phys., Vol. 36 (1997), p. 143 and Jpn. J. Appl. Phys., Vol. 36 (1997), p. 1068).

(STN-Mode Liquid Crystal Display)

The stretched cellulose acylate film B of the present invention may be used as a support of the optical compensation film for an STN-mode liquid crystal display having an STN-mode liquid crystal cell. Generally, in the STN-mode liquid crystal display, the rod-shaped liquid crystalline molecules in the liquid crystal cell are twisted by an angle in the range of 90 to 360 degrees and the product (And) of the refractive index anisotropy (Δn) of the rod-shaped liquid crystalline molecule and a cell gap (d) is in the range of 300 to 1500 nm. The optical compensation film used for the STN-mode liquid crystal display is described in Japanese Patent Application Laid-Open No. 2000-105316.

(VA-Mode Liquid Crystal Display)

The stretched cellulose acylate film B of the present invention may be used as an optical compensation film and as a support of the optical compensation film, which are used for a VA-mode liquid crystal display having a VA-mode liquid crystal cell. The VA-mode liquid crystal display may be of orientation division mode as described in, for example, Japanese Patent Application Laid-Open No. H10-123576.

(IPS-Mode Liquid Crystal Display and ECB-Mode Liquid Crystal Display)

The stretched cellulose acylate film B of the present invention is especially advantageously used as an optical compensation film and a support of the optical compensation film, or as a protective film for the polarizing plate, which are used for an IPS-mode liquid crystal display and an ECB-mode liquid crystal display having IPS-mode and ECB-mode liquid crystal cells. These modes are an embodiment in which the liquid crystal materials become oriented nearly parallel when displaying black. To display black, the liquid crystal molecules are oriented parallel to the substrate surface in a state of no voltage application.

(OCB-Mode Liquid Crystal Display and HAN-Mode Liquid Crystal Display)

The stretched cellulose acylate film B of the present invention is also used advantageously as a support of the optical compensation film, which is used for an OCB-mode liquid crystal display having an OCB-mode liquid crystal cell or an HAN-mode liquid crystal display having an HAN-mode liquid crystal cell. In the optical compensation film used for the OCB-mode liquid crystal display or the HAN-mode liquid crystal display, there is preferably no direction where the absolute value of retardation becomes minimum in the plane or in a normal direction of the optical compensation film. The optical properties of the optical compensation film used for the OCB-mode liquid crystal display or the HAN-mode liquid crystal display are also determined by the optical properties of the optical anisotropic layer, the optical properties of the support, and arrangement of the optical anisotropic layer and the support. Regarding optical compensation film used for the OCB-mode liquid crystal display or the HAN-mode liquid crystal display, there is a description in Japanese Patent Application Laid-Open No. H9-197397. There is also a description in a paper by Mori et al. (Jpn. J. Appl. Phys., Vol. 38 (1999), p. 2837).

(Reflective Liquid Crystal Display)

The stretched cellulose acylate film B of the present invention is also advantageously used as an optical compensation film for TN-mode, STN-mode, HAN-mode, and guest-host (GH)-mode reflective liquid crystal displays. These display modes have long been known well. As for the TN-mode reflective liquid crystal display, there are descriptions in Japanese Patent Application Laid-Open No. H10-123478, WO 98/48320, and Japanese Patent No. 3022477. Regarding optical compensation film used for the reflective liquid crystal display, there is a description in WO 00/65384.

(Other Liquid Crystal Displays)

The stretched cellulose acylate film B of the present invention is also advantageously used as a support of the optical compensation film for an axially symmetric aligned microcell (ASM)-mode liquid crystal display having an ASM-mode liquid crystal cell. The liquid crystal cell of ASM-mode is characterized in that the thickness of the cell is maintained by a resin spacer, the position of which is adjustable. Other properties are similar to those of a TN-mode liquid crystal cell. Regarding an ASM-mode liquid crystal cell and an ASM-mode liquid crystal display, there is a description in a paper by Kume and others (Kume et al., SID 98 Digest, 1089 (1998)).

<Hard Coat Film, Anti-Glare Film, and Anti-Reflection Film>

The stretched cellulose acylate film B of the present invention may, depending on the situation, be applied to a hard coat film, an anti-glare film, and an anti-reflection film. For the purpose of improving visibility of a flat panel display such as LCD, PDP, CRT, and EL, any or all of the hard coat layer, the anti-glare layer, and the anti-reflection layer can be disposed on one surface or both surfaces of the cellulose acylate film of the present invention. The desirable embodiments of such an anti-glare film and an anti-reflection film are described in detail in the JIII Journal of Technical Disclosure (Journal of Technical Disclosure No. 2001-1745, Mar. 15 (2001), Japan Institute of Invention and Innovation), pp. 54-57 and can preferably be used also in the cellulose acylate film of the present invention.

EXAMPLES

In Examples of the present invention, a cellulose triacetate (TAC) film was formed by a solution film-forming method, and the film was subjected to longitudinal stretching under the condition of free-end uniaxial stretching to produce a stretched cellulose triacetate film.

The table in FIG. 4 collectively lists, with regard to Examples 1 to 12 of the present invention and Comparative Examples 1 to 4, the stretching conditions, the film heating conditions, the film cooling conditions, as well as the evaluation results (Re, Rth, film surface appearance, and displacement of the orientation axis) of the stretched cellulose triacetate films produced.

In FIG. 4, the term "distance between rolls" means the distance between the pair of stretching rollers and "Tc" refers to the crystallization temperature of cellulose triacetate. The term "width direction difference" means the temperature difference of the film in the width direction during longitudinal stretching and refers to the difference between the maximum temperature and the minimum temperature in the width direction. The term "temperature lowering rate" refers to the rate at which the film is cooled after longitudinal stretching. The "double circle" mark means "very good", the "circle" mark means "good" and the "x" mark means "bad".

Examples 1 to 9 and Example 11 represent the cases where all of the stretching conditions, the film heating conditions, and the film cooling conditions satisfy the preferable condition of the present invention.

Example 10 is a case where, in the heating condition, the slit width of the heating nozzle is 1 mm and does not satisfy the preferable condition of the present invention.

Example 12 is a case where the distance between the rolls in the stretching condition, the temperature lowering rate in the film cooling process, the stretching time in the heating oven, the distance of the heating nozzle to the film in the film heating process, and the wind velocity do not satisfy the preferable conditions of the present invention.

Comparative Example 1 is a case where the longitudinal stretch ratio, an essential condition of the present invention, is not satisfied.

Comparative Example 2 is a case where the heating temperature (lower than the lower limit of 185° C.) does not satisfy the essential condition of the present invention and stretching stress (higher than the upper limit of 8 MPa) does not satisfy the preferable condition.

Comparative Example 3 is a case where the heating temperature (higher than the higher limit of 265° C.) does not satisfy the essential condition of the present invention and stretching stress (lower than the lower limit of 0.4 MPa) does not satisfy the preferable condition.

Comparative Example 4 is a case where not only the width direction difference (temperature difference in the film width direction) in film heating, an essential condition of the present invention, is not satisfied and, in addition, preferable conditions of the distance between the rolls, the temperature raising rate in film heating, the stretching time in the heating oven, the slit width of the heating nozzle and the distance thereof to the film, the wind velocity, and the floating height in the float-conveying are not satisfied.

As a result, in Examples 1 to 12, Re became 100 nm or more, which is the target of the present invention. Further, calculation based on Re and Rth in FIG. 4 showed that all of Examples 1 to 12 satisfied the target of the present invention, Rth<(Re/2).

Furthermore, in Examples 10 and 12, the film surface appearance and displacement of the orientation axis were somewhat inferior compared to Examples 1 to 9 and Example 11, where all of the stretching conditions, the film heating conditions, and the film cooling conditions are satisfied. From this result, it became clear that an even better result is obtained when the preferable conditions of the present invention are also satisfied.

In contrast, in Comparative Example 1, the film broke when being stretched and, in Comparative Example 2, Re was 90 nm and did not attain 100 nm or more, the target of the present invention. Further, in Comparative Example 3, Re satisfied being 100 nm or more but Rth<(Re/2) was not satisfied.

Furthermore, in Comparative Example 4, though Re and Rth were satisfied, the film surface appearance and displacement of the orientation axis were defective, so the film could not be used as an optical film product.

The invention claimed is:

1. A method for producing a stretched cellulose acylate film having an in-plane retardation, Re, of 100 nm or more and a relationship between a thickness direction retardation, Rth, and Re which satisfies Rth<(Re/2), by longitudinally stretching an unstretched cellulose acylate film in a longitudinal direction by pulling by means of a difference in circumferential velocity between a pair of stretching rollers, the method comprising:
subjecting the cellulose acylate film to free-end uniaxial stretching to a longitudinal stretch ratio of 1 to 2; and
while subjecting the film to said free-end uniaxial stretching, heating the film in a heating oven installed between the pair of stretching rollers at a stretching temperature in the range of Tc−10° C. to Tc+70° C., Tc being the crystallization temperature of the film, and with the temperature difference in the film width direction maintained within 10° C., wherein
hot-air heating is carried out in the heating oven by blowing hot-air toward a film surface at a wind velocity of 0.5 to 20 m/sec from a heating nozzle, with the slit width of the blowout opening being 2 to 10 mm and the distance from the blowout opening to the cellulose acylate film surface being 20 to 500 mm.

2. The method for producing a stretched cellulose acylate film according to claim 1, characterized in that the rate at which the cellulose acylate film is heated up to the stretching temperature in the heating oven is 10 to 400° C./min.

3. The method for producing a stretched cellulose acylate film according to claim 2, characterized in that a process of forcibly cooling the longitudinally stretched cellulose acylate film is provided after the free-end uniaxial stretching process, with the film cooling rate of the cellulose acylate film being 10 to 400° C./min.

4. The method for producing a stretched cellulose acylate film according to claim 1, characterized in that the cellulose acylate film is float-conveyed by hot air blown out of a plurality of heating nozzles, the plurality of the heating nozzles being installed at positions above and below the cellulose acylate film and in the longitudinal direction.

5. The method for producing a stretched cellulose acylate film according to claim 4, characterized in that the floating height in the float-conveying is within 30 mm.

6. The method for producing a stretched cellulose acylate film according to claim 1, characterized in that the stretching time in the heating oven is at least 1 second and at most 100 seconds.

7. The method for producing a stretched cellulose acylate film according to claim 1, characterized in that the distance between the pair of stretching rollers is at least 1 m and at most 100 m.

8. The method for producing a stretched cellulose acylate film according to claim 1, characterized in that the stress exerted on the cellulose acylate film in the longitudinal direction between the pair of stretching rollers is set in the range of at least 0.4 MPa and at most 8 MPa.

9. The method for producing a stretched cellulose acylate film according to claim 1, characterized in that the unstretched cellulose acylate film is a cellulose triacetate film (TAC) formed by a solution film-forming method.

10. The method for producing a stretched cellulose acylate film according to claim 4, characterized in that the stretching time in the heating oven is at least 1 second and at most 100 seconds.

11. The method for producing a stretched cellulose acylate film according to claim 4, characterized in that the distance between the pair of stretching rollers is at least 1 m and at most 100 m.

12. The method for producing a stretched cellulose acylate film according to claim 4, characterized in that the stress exerted on the cellulose acylate film in the longitudinal direction between the pair of stretching rollers is set in the range of at least 0.4 MPa and at most 8 MPa.

13. The method of claim 1, wherein the free-end uniaxial stretching and the stretching by longitudinal pulling by the pair of stretching rollers having different circumferential velocity are performed as a single step during heating of the film.

* * * * *